United States Patent [19]

Cribbs et al.

[11] 4,268,828
[45] May 19, 1981

[54] SWEPT FREQUENCY RADAR SYSTEM EMPLOYING PHASELESS AVERAGING

[75] Inventors: Robert W. Cribbs, Placerville; Billy L. Lamb, Sacramento; Thomas J. DeLacy, Los Altos, all of Calif.

[73] Assignee: Ford Aerospace & Communications Corporation, Detroit, Mich.

[21] Appl. No.: 77,250

[22] Filed: Sep. 19, 1979

[51] Int. Cl.³ .......................................... G01S 13/95
[52] U.S. Cl. ............................... 343/5 W; 343/5 FT
[58] Field of Search ............................ 343/5 FT, 5 W

[56] References Cited

U.S. PATENT DOCUMENTS

| | | | |
|---|---|---|---|
| 2,481,034 | 9/1949 | Neufeld | 343/5 FT X |
| 3,135,957 | 6/1964 | Cunningham et al. | 343/5 FT X |
| 3,181,156 | 4/1965 | Ward | 343/5 FT X |
| 3,680,085 | 7/1972 | DelSignore | 343/5 FT X |
| 3,967,283 | 6/1976 | Clark et al. | 343/5 FT X |
| 3,974,501 | 8/1976 | Ritzie | 343/5 FT X |
| 3,987,285 | 10/1976 | Perry | 343/5 FT X |
| 4,028,700 | 6/1977 | Carey et al. | 343/5 FT X |
| 4,047,173 | 9/1977 | Miller | 343/5 FT X |
| 4,053,885 | 10/1977 | Tomita et al. | 343/5 FT X |
| 4,054,879 | 10/1977 | Wright et al. | 343/5 FT X |
| 4,075,630 | 2/1978 | Shapiro et al. | 343/5 FT X |
| 4,084,158 | 4/1978 | Slawsby | 343/5 FT X |
| 4,104,631 | 8/1978 | Weigle et al. | 343/5 FT X |
| 4,107,681 | 8/1978 | Robertson et al. | 343/5 FT X |
| 4,124,848 | 11/1978 | Clark et al. | 343/5 FT X |

OTHER PUBLICATIONS

David H. George; *A Comparison of Currently Used Cloud Height Sensors;* 2nd Sympos., Meteor. Obs. & Inst/Amer Meteor. Soc.; 27-30 Mar. 1972, pp. 223-230.
R. B. Chadwick et al.; *Measurements Showing Feasability for Radar Detection of Hazardous Wind Shear at Airports;* AFGL-TR-78-0160, NOAA Final Report, 21 Jun., 1978.
R. B. Chadwick et al.; *New Radar for Measuring Winds;* Bulletin of the American Meteorological Soc.; vol. 57, No. 9, pp. 1120-1125, Sep. 1976.
K. L. Fuller; *AVOID, A Short-Range High-Definition Radar;* Philips Tech. Rev., vol. 32, No. 1, pp. 13-19, 1971.
George H. Barry; *A Low-Power Vertical-Incidence Ionosonde;* IEEE Transactions on Geoscience Electronics; vol. GE-9, No. 2, Apr. 1971, pp. 86-89.

*Primary Examiner*—T. H. Tubbesing
*Attorney, Agent, or Firm*—Edward J. Radlo; Clifford L. Sadler

[57] ABSTRACT

Described herein is a microwave radar system which employs heterodyned swept frequency at approximately two millisecond sweep intervals. The power source is a reliable solid state, low power device such as a Gunn diode. The heterodyned difference frequency signals are converted to digital form, transformed into the frequency domain by means of a Fourier power transform, and then averaged by computer processing. Performing the Fourier power transform before averaging enables the processing of quasi-incoherent data whereby signal-to-noise ratio improvement is a function of the square root of the average number of samples taken. High-speed processing is used to off-set the loss of statistical averaging of phase-coherent data which cannot be preserved because of target motion. Thus, the sequence of the power transform allows phase-less averaging over the entire collection period. Complementary elements including signal isolation and stability, through interdependent design features of the antenna and circulator, permit the use of low-power CW radar which minimizes danger to ecology and human safety. Thus, the invention has particular applicability to the analysis of clouds, the extraction of range and thickness data of clouds, and the presence and velocity of rainfall. The invention can be used for point targets as well. Algorithms are built into the computer to compensate for various factors such as wind, temperature, and the nature of scattering nuclei.

21 Claims, 3 Drawing Figures

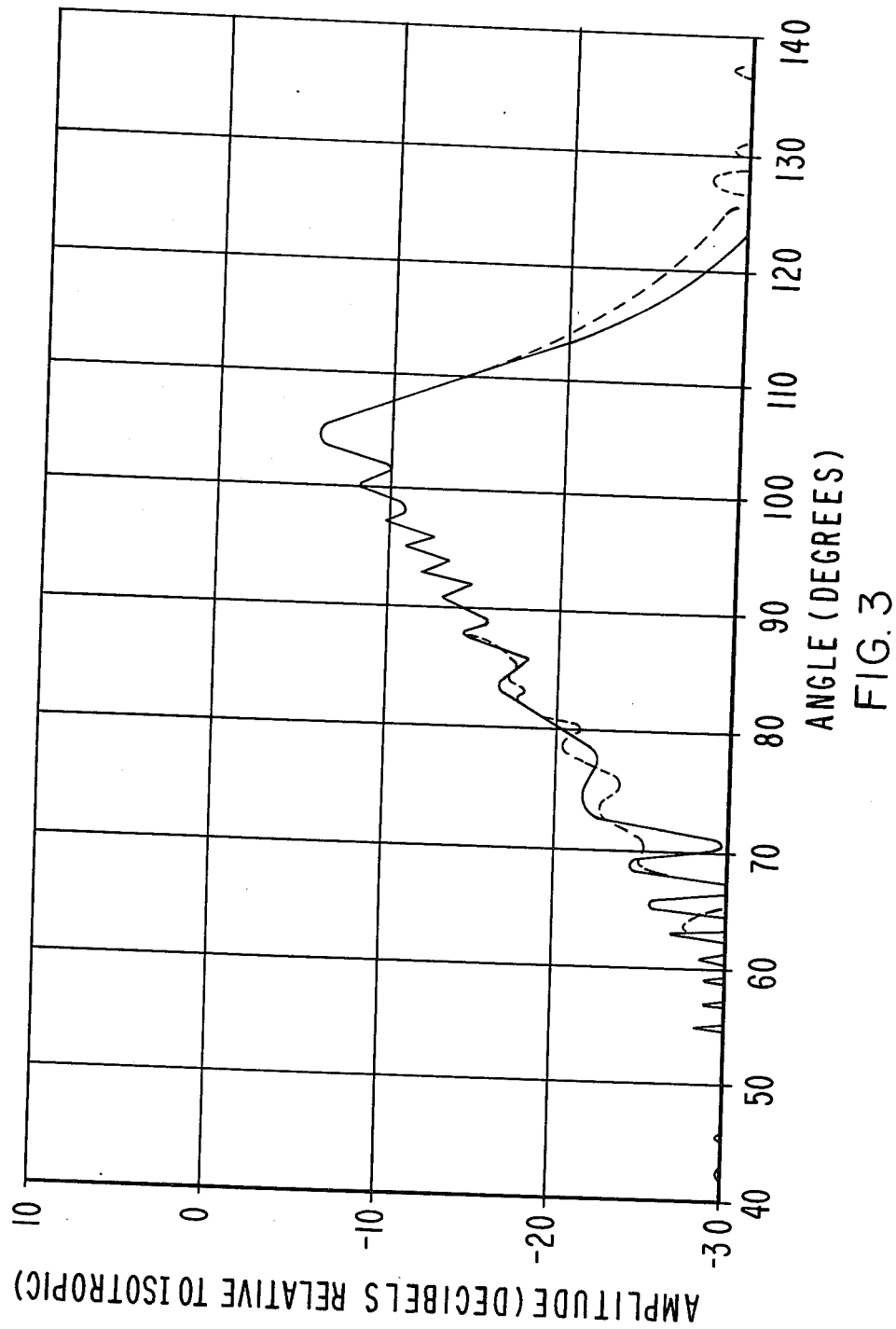

SWEPT FREQUENCY RADAR SYSTEM EMPLOYING PHASELESS AVERAGING

BACKGROUND OF THE INVENTION

1. Field of the Invention

The invention is a low power heterodyned swept frequency microwave radar system for averaging echoes. The averaged echoes need not be phase correlated. The invention has particular applicability for analyzing distributed targets such as clouds, i.e., a ceilometer.

2. Description of the Prior Art

A prior art search was performed and uncovered the following references:

George, David H., "A Comparison of Currently Used Cloud Height Sensors", Second Symposium, Meteorological Observations and Instrumentation of the American Meteorological Society, Mar. 27–30, 1972, San Diego, CA, p. 223 et seq. provides an overview of the ceilometer art. The paper indicates that the trend in the art is towards lasers and away from microwave radar systems.

Chadwick, R. B. et al, "Measurements Showing the Feasibility for Radar Detection of Hazardous Wind Shear at Airports", AFGL-TR-78-0160, NOAA Final Report Nov. 1, 1976–Feb. 28, 1978, is a Doppler microwave system utilizing phase lock loops and coherent processing, unlike in the present invention. The purpose of Chadwick's device is to measure wind shear at airports.

U.S. Pat. Nos. 3,967,283 and 4,124,848 transmit signals to detect intruders. Unlike the present invention, they do not utilize Fourier transforms.

U.S. Pat. No. 3,680,085 is a swept frequency radar system for obtaining ranging information on a point target. It cannot be used for distributed targets as in the present invention because the patentee obtains his information solely from a single frequency. With distributed targets, different distributed targets could produce the same heterodyned frequency.

U.S. Pat. No. 4,075,630 utilizes a Fast Fourier Transform (FFT) in a pulsed radar system. The use of pulses in a radar system implies high power. The present invention eschews pulses to save cost, to provide greater safety for people and other animals in the near vicinity of the operating system, and for increased reliability.

U.S. Pat. No. 4,028,700 utilizes FFT in a chirp radar system as part of a method for tuning a radar to minimize sidelobes. It has no applicability to the low power swept frequency system of the present invention.

U.S. Pat. No. 4,084,158 utilizes a FFT in a pulsed radar system for lateral resolution data, not for ranging information as in the present invention.

U.S. Pat. No. 4,104,631 uses FFT to obtain Doppler information in a pulsed radar system.

U.S. Pat. No. 3,135,957 is a pulsed radar system, not a continuous wave (CW) system as in the present invention. It needs a fixed reference. It teaches away from the single antenna of the present invention in column 1 lines 26–30 wherein it states, "In frequency-modulated systems in which the peak power is moderate and the transmission and reception are simultaneous, difficulty is encountered in eliminating interference between the reflected signal and direct radiation from the local transmitting system". This problem would be worsened in a CW system. The patent does not use a Fourier transform as in the present invention. The ranging results are obtained just from frequency data, not from amplitude and frequency data as in the present invention.

U.S. Pat. Nos. 3,974,501 and 4,107,681 are FM-CW systems which do not provide for the processing of quasi-incoherent signals, which are obtained from the examination of distributed targets such as clouds.

U.S. Pat. No. 3,181,156 is a chirp radar system signal processing technique. By taking orthogonal Fourier sine and cosine components within computer 22, the patentee utilizes phase information for pulse synthesis. He does not perform a Fourier power transform into the frequency domain to destroy phase information for the purpose of signal averaging, as in the present invention.

U.S. Pat. No. 3,987,285 is a chirp radar system filtering technique which requires two FFT's and reference signals. The present invention does not require two FFT's or reference signals.

Chadwick, R. B., et al "A New Radar For Measuring Winds", Bulletin of the American Meteorological Society, Volume 57 No. 9, pp. 1120–1125, September 1976, is a high power CW-FM radar that measures wind velocity by sensing phase variations from sweep to sweep. The present invention, on the other hand, uses low power and destroys phase information.

Fuller, K. L., "AVOID, A Short-Range High-Definition Radar" Philips Tech. Rev. 32, No. 1, pp. 13–19 (1971) is a radar system which obtains ranging information based only on frequency. It is an analog, not a digital system, and does not use Fourier transforms. On the other hand, the present invention utilizes amplitude and frequency information, is a digital system, and does use Fourier transforms.

Barry, G. H., "A Low-Power Vertical-Incidence Ionosonde", *IEEE Transactions on Geoscience Electronics*, Vol. GE-9, No. 2, April 1971, pp. 86–89 is a radar ranging technique which is analog, does not use Fourier transforms, and has separate transmitting and receiving antennas. The present invention, on the other hand, is digital, does use Fourier transforms, and in its preferred embodiment utilizes the same J-hook antenna for both transmitting and receiving.

U.S. Pat. No. 3,720,949 is a high power FM-CW radar system that does not use Fourier transforms and does not contemplate the processing of incoherent or quasi-incoherent signals. The present invention, on the other hand, is low power, uses Fourier transforms and does process quasi-incoherent signals such as are produced by distributed targets.

"Category II Final Test Report for Radar Cloud Detecting Set An/TPQ-11 (Production Model)", Technical Report No. ESD-TR-65-7, Dec. 17, 1965, Electronic Systems Command, United States Air Force, describes a pulsed radar ceilometer utilizing extremely high power (100 KW nominal peak power) which makes it much more expensive, dangerous and less reliable than the device of the present invention.

Secondary references are U.S. Pat. Nos. 2,481,034, 2,822,536, 3,603,990, 3,803,609, 3,823,399, 4,044,353, 4,044,355, 4,065,768, 4,092,644, 4,103,300, 4,106,020, 4,106,872, 4,121,889; and Barrick, D. E., "FM/CW Radar Signals and Digital Processing", NOAA Technical Report ERL 283-WPL 26, July 1973. The latter reference addresses the subject of signal processing with respect to FM/CW radar, employing coherent averaging. The reference teaches away from the approach of phaseless averaging as described in the instant specification.

SUMMARY OF THE INVENTION

The present invention is a low power heterodyned swept frequency radar system which is particularly suitable for processing quasi-incoherent data, such as are produced by the isotropic scatter of distributed targets, such as clouds and raindrops. Thus, the invention has particular applicability as a ceilometer to measure the height of cloud layers, the thickness of cloud layers, and the presence and velocity of rainfall. This information is particularily useful to meteorologists and to airline pilots.

The microwave source is a low power (approximately 200 milliwatt) solid state source such as a 35 GHz Gunn diode. The same antenna is preferably used for transmission and reception and is preferably a J-hook antenna with good side lobe suppression. Isolation is provided by a microwave circulator. The amplified and filtered heterodyned difference signals are converted to digital form by an analog/digital converter, are processed by a fast Fourier transform converting them to the frequency domain, and then are averaged by computer.

The performance of the FFT power transformation prior to averaging is a departure from prior systems and it provides for the processing of quasi-incoherent data. If such data were first averaged and then transformed into the frequency domain, much of the data would cancel itself out. The penalty in performing the Fourier transform first is that the signal-to-noise ratio rises with the square root of the number of exposures rather than proportionally to the number of exposures or data points. However, this statistical penalty is off-set by the speed of the sweep, A to D converter, and power transform, which allows the processing of a large number of samples for subsequent "phaseless" averaging.

The computer performs a number of functions. Apart from averaging the output amplitude versus frequency data produced by the FFT to generate a representation of the amplitude versus frequency for the entire sampling interval, the computer converts this into a digested form easily used by the operator, such as thickness and intensity of the cloud as a function of altitude. The computer also checks for a signal overflow from the FFT. It can check on the reasonableness of the conclusions versus pre-programmed parametric data points, and it can provide for a check on the operating characteristics of the system, such as the temperature at which the various microwave components are maintained.

BRIEF DESCRIPTION OF THE DRAWINGS

These and other more detailed and specific objects and features of the present invention are more fully disclosed in the following specification, reference being had to the accompanying drawings, in which:

FIG. 3 is a radiation pattern of the preferred antenna of the preferred embodiment showing the wide-angle side lobe region.

DESCRIPTION OF THE PREFERRED EMBODIMENTS

Figure 1:
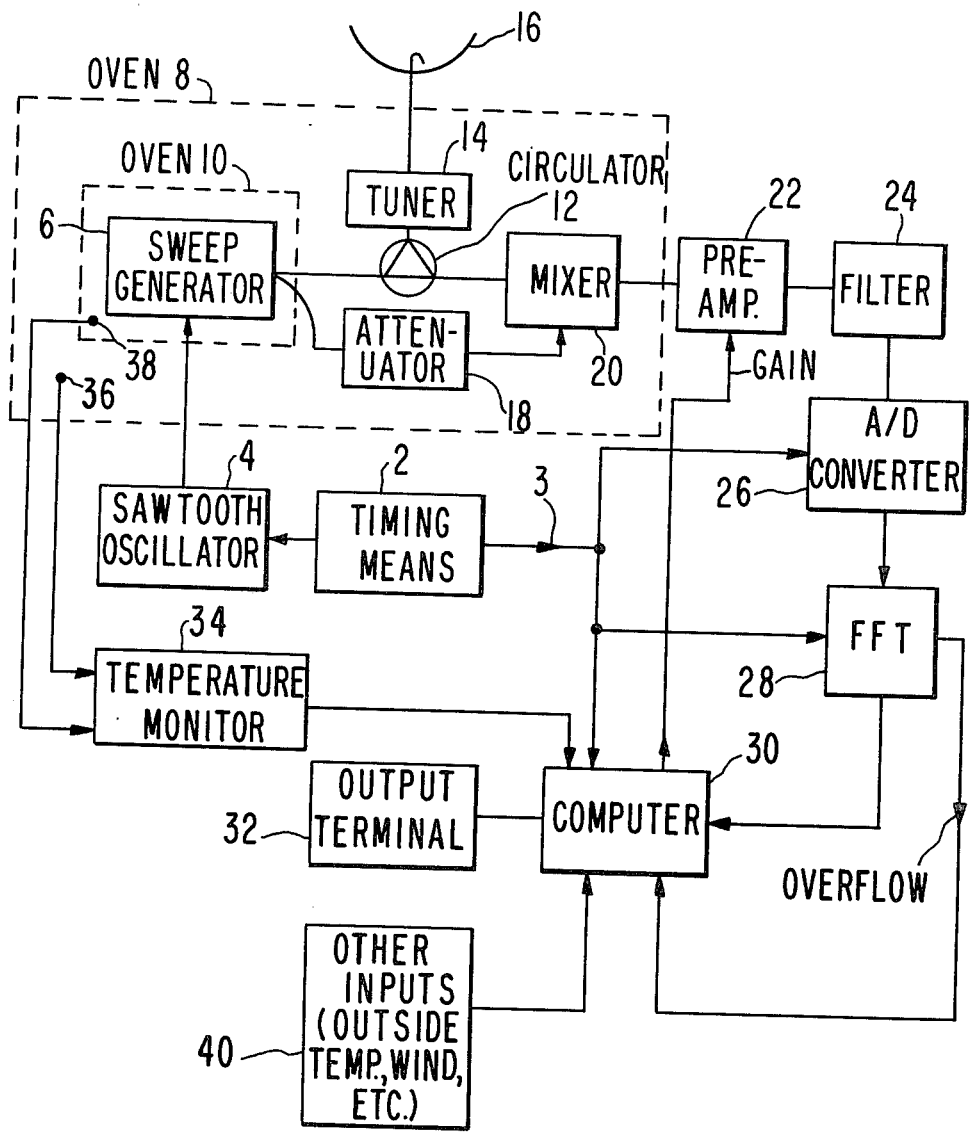
FIG. 1 is a block diagram of the preferred embodiment of the present invention.

Referring to the block diagram, FIG. 1, the microwave signal is produced by a low-power solid state source such as a Gunn diode. The function of sawtooth oscillator 4 is to provide a quiet sawtooth pattern to drive the frequency of the microwave sweep generator 6. Oscillator 4 should thus have a separate outboard power supply to eliminate any noise that might cause FM noise in the microwave system. The result is a quiet enough source without the need for a phased lock loop, prevalent in the prior art approaches. The range of frequency swept by the sawtooth oscillator is typically 9.82 MHz for a desired resolution of 50 feet with two milliseconds per sweep, about one millisecond of which is usable. A longer sweep might cause spreading and resolution loss. A shorter sweep results in less sampling information acquired from the target and thus requires the averaging of more sweeps.

Timing means 2 controls the clocking and synchronization of all parts of the system. It synchronizes the collection of data scattered by the cloud or other target with the transmission of signals by the sweep generator microwave source. The timing means provides a clocking signal to control the frequency of oscillation of sawtooth oscillator 4. A multiwire bus 3 conveys clocking information from timing means 2 to analog/digital converter 26, fast Fourier transform 28, and computer 30. It is helpful in the preferred embodiment for a 2 MHz clock pulsetrain to be conveyed by timing means 2 to fast Fourier transform 28. An input ready signal signifies the start of a frequency sweep. The Fourier transform hard wire device then begins to obtain its information from A/D converter 26.

A longer sweep time has the advantage of less power being needed or fewer sweeps averaged; however, when processing scattering information from clouds the scattered echoes become totally phase incoherent and unusable with sweep times of approximately 10 milliseconds or greater due to the distributed nature and the motion of the cloud. A 2 millisecond or less sweep is preferable. The use of a Hamming window in the Fourier transform preserves the integrity of the signal by emphasizing the information from the central 1 millisecond of the sweep. This is an optimum sweep time to preserve the limited coherence which is necessary for the processing modules to function while yielding enough information to produce meaningful results.

Sawtooth oscillator 4 can be part of a Gunn diode which is preferred because of the overly expensive modulation/demodulation section and worse AM noise characteristics of an Impatt diode, the next best choice. In any event, sawtooth oscillator 4 drives the Gunn diode or other microwave source.

Sweep generator 6 is preferably a 35 GHz Gunn oscillator operated at 200 milliwatts. It can be run in a swept frequency mode such as 5 MHz or 20 MHz, depending upon the resolution requirements of the system, or a fixed frequency mode which will give Doppler information so one can measure, for example, the vertical fall velocity of rain. This low power is preferable from a safety and expense standpoint over prior art high power systems such as the AN/TPQ-11 ceilometer system which employs a magnetron generator. The typical resolution requirements for a ceilometer system are 50-250 foot resolution to analyze clouds up to a maximum height of 10,000 feet. Historically, this has been an adequate height to satisfy the requirements of pilots and meteorologists. At this height the microwave signals travel to and from the cloud in a time approximately equal to one percent of the sweep time.

Microwave components 6, 12, 14, 18, and 20 are physically situated within oven 8. Additionally, sweep generator 6 is in a second oven 10 which is physically located within first oven 8 to provide for a different, more precise, temperature than that for the other microwave components. The purpose of the ovens is to provide stable voltage versus frequency characteristics by maintaining a stable temperature. In particular, the circulator 12 and the source 6 are sensitive to temperature variations. The ovens could be replaced by strip heaters within the electronics enclosure for meeting the humidity and temperature requirements.

Temperature sensing means 36 senses the temperature within oven 8 and provides a signal representing said signals for later use. Similarly, temperature sensing means 38 senses the temperature within oven 10 and provides a signal corresponding to said temperature to temperature monitor 34.

Because of the use of the second oven 10, the system is able to dispense with the delay line calibrator used by prior art systems to correct for temperature instability.

Circulator 12 can be magnetized ferrite pill in a waveguide. Its function is to isolate the incoming from the outgoing signals and to provide directional coupling for each.

Tuner 14 is a mechanical or electronic device which is usually part of the diode microwave source. Its function is to maximize the efficiency of said source and to minimize the effect of AM noise on system performance. It provides a tuning signal that offsets microwave leakage through circulator 12. If the circulator leakage varies, too much direct signal will reach mixer 20 resulting in excess AM noise. The AM noise is comparable to thermal noise. Higher source power levels do not necessarily result in correspondingly higher signal-to-noise ratios because of this leakage through the circulator.

The function of attenuator 18 is to provide some of the source signal to the mixer 20 where it is beat or heterodyned with the incoming signal received through antenna 16. The degree of attenuation can be varied as necessary.

Figure 2:
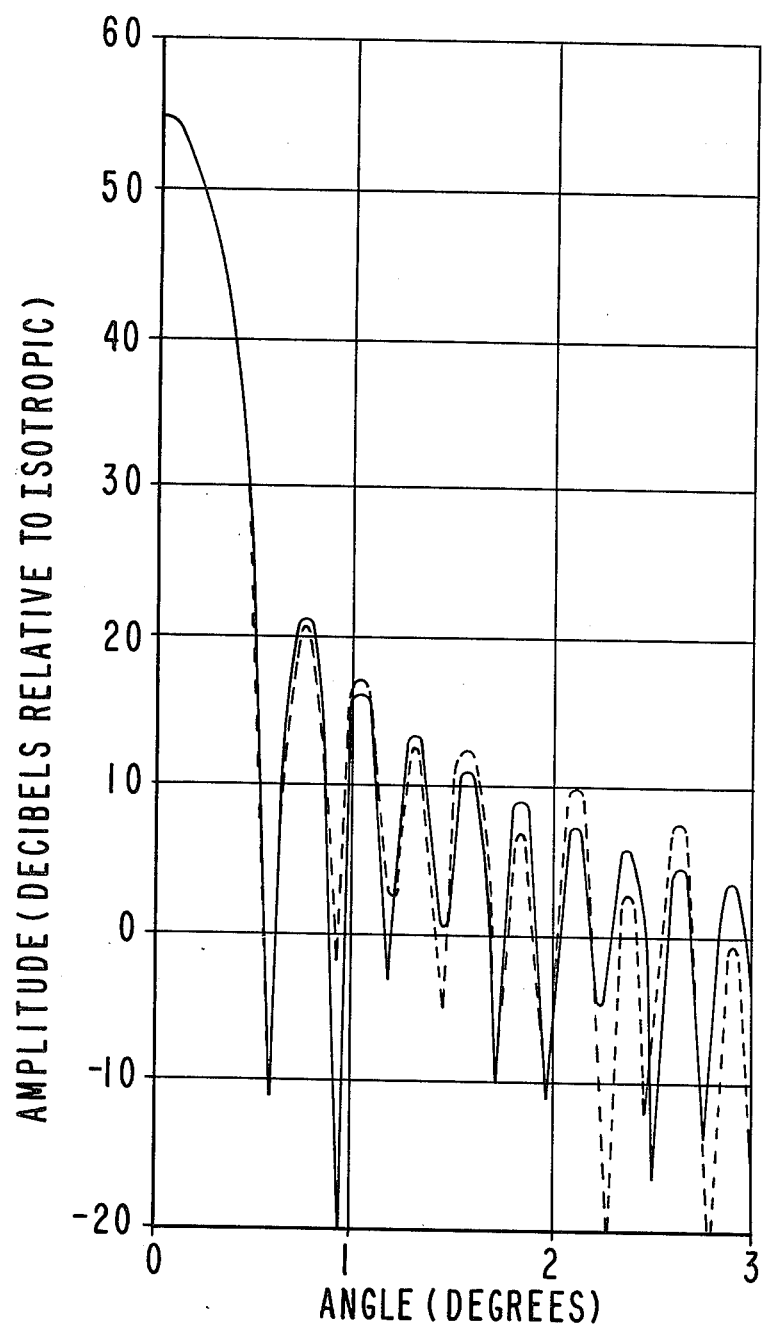
FIG. 2 is a radiation pattern of the preferred antenna of the preferred embodiment showing the near-angle, center-beam axis side lobe region.

Antenna 16 is a single antenna in the preferred embodiment. This is better than using two antennas because it results in less expense and a smaller instrument. This can be achieved with an antenna having sidelobes a minimum of 60 db down from the peak in the region outside 45° from the major desired beam axis; and if the sweep interval is less than 10 milliseconds, to avoid interference between the incoming and outgoing signals. A suitable antenna radiation pattern is illustrated in FIGS. 2 and 3. FIG. 2 shows the near sidelobes. FIG. 3 shows the distant sidelobes, with the solid line representing the H-plane and the dotted line representing the E-plane. The antenna requirement can be met with a J-hook reflector antenna used to reduce aperture blockage to yield low sidelobe levels. This antenna has simple design and is inexpensive. It typically has a six foot reflector for a 35 GHz frequency range, and can be made with an efficiency of greater than 55%. If used primarily for analyzing clouds, the antenna can be stationary, but if it is desired to scan in more than one direction the antenna can be mounted on a movable means such as a gimbal. In an alternative embodiment, one could use separate antennas for transmission and reception and by so doing dispense wth the circulator.

The prior art teaches away from the preferred embodiment of a single antenna. For example, Barry, "A Low-Power Vertical-Incidence Ionosonde", supra, at p. 87 states "Later work at the Stanford Radioscience Laboratory was conducted using a single antenna for both transmitting and receiving . . . but the results were not promising because of transmitter noise and receiver overload". Then when the author constructed an experimental FM vertical incidence sounder using a single antenna, "We despaired of ever achieving a sufficiently quiet transmitter to permit CW operation and, instead, gated the transmitter off half the time to provide listening intervals". Ibid, P. 88.

Balanced mixer 20 is a precision device requiring a reference signal of approximately 2 milliwatts of power from the source through the attenuator in order to heterodyne the received signal. The mixer 20 can be part of the Gunn diode. It is an electronic device which generates the beat or difference frequency signal between the reference and the received signals. For a system measuring cloud heights from 50 feet to 10,000 feet, its output is a band of signals from 1 KHz to 200 KHz.

Preamplifier 22 is an amplifier having gain to 200 KHz and having low noise characteristics. The gain of the amplifier can be adjusted by means of a signal sent by computer 30.

Filter 24 acts to filter out unwanted AM noise. It has attenuation characteristics of 40 db/decade (12 db/octave) on the high end and 20 db/decade (6 db/octave) on the low end. The 6 db/octave characteristic is used to compensate for diminution in signal strength due to scatter from distributed (i.e., cloud) targets which follow an inverse square law. A 12 db/octave rolloff characteristic on the low end would be required to compensate for the inverse 4th power law characteristic of discrete targets. The filter is the equivalent of a timegain compensation network in a pulsed radar system.

The analog-to-digital converter 26 is inserted in this system because digital processing enables one to take advantage of the faster speed of the fast Fourier transform. The analog-to-digital conversion is done after filtering to maximize the dynamic range. This allows for weak and strong signals to be simultaneously averaged. The A/D converter continually converts. A clock signal from timing means 2 signals to the converter the beginning of the frequency sweep and the end of the frequency sweep so that the converter can reinitialize and give its contents to FFT 28 at the appropriate time. Furthermore, any non-linearities in the sweeps can be corrected for with the timing signals at this point, which can be modified by signals from computer 30. During each single two millisecond sweep the A/D converter outputs 1024 words representing the amplitude of the input signal to it at each of 1024 time slices. In this way the A/D converter digitizes the amplitude of the input signal.

FFT 28 is a fast Fourier transform which operates on the 1024 input words coming from the A/D converter. It does not necessarily have to be capable of processing in real time because in many environments, e.g., the ceilometer application, the operator wishes to take his measurements only once every 30 seconds or so. A typical FFT will operate on a set of 1024 input words representing a single sweep in less than approximately 20 milliseconds. The FFT preferably contains a Hamming window to provide smooth transitions at the edges of clouds. In order to accommodate the large numbers associated with the FFT processing technique, the FFT is designed to have output words that are 16 bits long. Part of each output word is reserved for an overflow flag indicator, which is present when the circuitry of the FFT experiences a surfeit of data. If the overflow flag is present the computer 30 is programmed to ignore the data and to reduce the gain of the preamplifier 22 if necessary.

FFT 28 converts the digitized amplitude versus time function (its input) into an amplitude versus frequency function. The output domain of the FFT is a set of frequencies up to 256 KHz. There are 512 frequency bins with spacing between frequency bins of 500 Hz.

The FFT 28 transforms the signal into a frequency power spectrum by taking the sum of the squares of the sine and cosine finite Fourier transform so that processing of the quasi-incoherent data, such as results from the relative motion of scattering nuclei within clouds, can be employed. This is followed by averaging by computer 30. The power spectrum destroys whatever phase information is present in the echo signals. If the averaging were done before the phase information were destroyed, the phase incoherence of the echoes would cause the signals to cancel on averaging not add. This technique of phaseless averaging of the present invention has the result that the signal-to-noise ratio goes up as the square root of the number of signals averaged, whereas in averaging in which the phase is preserved such as in the coherent processing of point target radar systems, the signal-to-noise ratio goes up proportionately with the number of signals averaged.

A hard wired fast Fourier transform module 28 for the preferred embodiment has been designed wherein the parameters were calculated for a range of 10,000 feet. The ceilometer system can be readily used for altitudes of up to 40,000 feet or 60,000 feet by using a narrower bandwidth. For example, by reducing the bandwidth by one-fourth, the range bins and total range are increased by a factor of four with the only other requirement that more data need be averaged to maintain signal-to-noise ratio at the greater distance.

The signal beat frequency is 200 KHz for the 1 millisecond sweep of the 9.82 MHz bandwidth required for 50 feet cloud resolution. The sample and hold circuitry must operate at over twice the 200 KHz rate, say 500 KHz. By putting in a Hamming filter, the edge of the cloud is more easily distinguished. Since the Hamming filter also degrades resolution, an increase in bandwidth is required to compensate. The final parameters are a sweep time of 2 milliseconds and a sweep bandwidth of 20 MHz. The Hamming window allows the central 1 millisecond of the data to contribute most of the spectrum as originally required. With the Hamming window, 1024 samples are required. The hard wired FFT processor can provide the transform in less than 20 milliseconds.

The input to the FFT module is a series of 1024 twelve-bit words and the output is a series of 512 sixteen-bit words. It is possible to overflow the output. If this happens, the FFT module will provide an overflow flag to computer 30. Computer 30 will ignore the data. If the overflow condition persists, computer 30 will decrease the gain of the preamplifier 22 circuits as appropriate.

It is helpful for there to be a 2 MHz clock signal outputted from timing means 2 to FFT 28 from which the FFT 500 KHz sample clock is derived. An additional signal, an input ready signal, from timing means 2 signifies the start of a frequency sweep. If FFT 28 has completed the processing for its previous set of 1024 input words, it automatically counts in a new set of 1024 input samples from A/D converter 26, performs the Fourier transform, and no later than 22 milliseconds after the input ready, sends out an output ready signal to computer 30. The output of FFT 28 is then available as a burst of 512 words at the sampling clock rate; or it may be strobed out at an external clock rate. A "done" signal is then sent after the last output word has been sent. In any case, the input ready signal signals into the FFT and initiates a new cycle whether all outputs have been read by computer 30 or not.

Computer 30 then takes many digitized amplitude versus frequency curves from FFT 28 and averages them, making a phaseless averaged amplitude versus frequency curve which then becomes the basis for analyzing the target. An arbitrary number of these input curves may be averaged. It has been found that for clouds 1500 curves is more than enough to give good output data. The computer reformats this data after applying same against a preprogrammed table, algorithm, or set of parameters representing empirical data, and outputs the data in a form which is readily usable by the operator, e.g., a graph of cloud intensity, thickness, and distance (range). Computer 30 is typically a miroprocessor and is typically firmware programmed; thus, it is somewhat slower than FFT 28 but it is relatively inexpensive and the programming of it can be readily changed to adapt to changing environmental conditions. Typically, the computer should be capable of averaging at least 1500 samples in a 30 second period.

The output of the computer is portrayed on output terminal 32; which may be a CRT or a printer, so as to display the output showing the height and thickness of the clouds and the presence and velocity of rainfall.

As stated earlier, the computer also checks the signal overflow from the FFT. If the overflow persists, the gain of preamplifier 22 is reduced accordingly. If the averages are consistently low, the computer will signal to increase the gain of preamplifier 22.

The computer can check the reasonableness of its conclusions. For example, if the "bright band" corresponding to the freezing level is detected, it is compared with the surface temperature and reasonable lapse rates (lapse rate is defined as temperature change as a function of height) to see if it is indeed the freezing level.

Computer 30 can also memorize the "clear sky" pattern and subtract it from the data. This will correct for some systems errors that may occur, especially at short range. Furthermore, this may be used to subtract signals from sidelobes of the antenna if the antenna is rotated from vertical. Suppose for example, the system is used as a ceilometer at an airport and readings are made at vertical and at 45° north, south, east, and west. At one of these angles a structure such as a control tower may return a significant signal from a sidelobe of the antenna. Computer 30 then stores this systematic signal in its "clear sky" condition memory and subtracts this from the collected data.

Computer 30 also receives signals from temperature monitor 34 thereby analyzing the temperature within ovens 8 and 10 to insure that the data is reliable.

Other inputs to computer 30 can be conveyed by external inputting means 40 to convey to the computer the outside temperature, wind velocity, etc. to enable the computer program to factor-in required correction terms.

In the preferred embodiment the bulk of the calculations are based on a minimum range of 10,000 feet with 50-foot resolution. The time required to acquire adequate data is 0.72 seconds (representing 36 samples×20 milliseconds per sample). Since the required output data reporting for a ceilometer is typically every 30 seconds, a second mode may be used to extend the range of the instrument to 40,000 feet. Averaging over $0.72 \times (40,000/10,000)^2 = 11.52$ seconds will theoretically provide 200-foot resolution between 10,000 feet and 40,000 feet, since the number of samples required goes up as the square of the extra distance traveled by the microwaves because of the inverse square law of scattering, and the resolution drops off linearly as a function of the cloud height. The actual resolution may be less due to FM noise and peculiarities of the system, but will far exceed the 10% previously required by the Federal Aviation Administration for cloud measurements about 10,000 feet.

Apart from the presence of clouds as a function of altitude, computer 30 also calculates two additional functions: cumulative scatter cross section Z and the vertical fall velocity distribution of any rainfall present. This coupled with ambient temperature inputted by environmental monitor 40 provides an excellent estimate of rainfall rate, since rainfall rate is a function of velocity distribution and droplet size, droplet size is a function of Z, and Z is a function of ambient temperature.

The back scatter from moderate rain (4 millimeters per hour) and dense fog (visibility 100 feet) is the same. This means that dense fog can not be directly detected in heavy rain (16 millimeters per hour). Heavy rain has a scatter cross section nearly 10 times that of dense fog, that is, dense fog is 10 db weaker than heavy rain. If the heavy rain originates in fog, which it normally does, the presence of clouds can be derived from the data. But if the rain falls through the clouds the cloud will not be distinguished.

How can rain be distinguished from fog? A CW signal is transmitted by source 6 to measure the Doppler shift. Only precipitation close to the ground affects the measurement, because of the inverse square law. It is difficult to get range resolution or filtering to correct for an inverse square law in the Doppler mode. One calculates a more accurate rainfall rate in the following fashion.

The scatter relation used by previous investigators is $Z = CR^k$ where R is the rainfall rate and C and k are empirically determined constants. These constants have much experimental variation. If the scatter cross section and Doppler frequency are measured independently, a correction term can be used. The experimental variation in data reported in the prior art is probably due to the fact that different droplet sizes can produce the same rainfall rate R. The scatter cross section Z is more influenced by the larger drops. The size of the larger drops is a function of the vertical fall velocity, with the larger drops falling faster. The Doppler correction factor is obtainable by experimental data.

It is also true that temperature affects scatter cross section Z. Since the processing is done in a microprocessor, corrections can be built in. Microprocessor 30 inputs ambient temperature and humidity from environmental input device 40, and uses the appropriate lapse rate to perform the correction. This also provides a means for the computer to distinguish snow from rain; this can be verified by the relationship between the Doppler speed and the scatter cross section.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A swept frequency microwave system for analyzing a target comprising:
   a source of microwave radiation whose frequency is made to sweep in a repetitive fashion;
   means connected to said source for bouncing said radiation off the target, said bouncing means producing a series of heterodyned signals;
   means connected to said bouncing means for taking the Fourier power transform of a group of said heterodyned signals; and
   means connected to said Fourier power transform means for averaging the Fourier power transformed signals over a plurality of frequency sweeps.

2. The apparatus of claim 1 further comprising a first oven for controlling the temperature of said source and a second oven for controlling the temperature of said bouncing means.

3. The apparatus of claim 1 wherein said Fourier transform means comprises means for taking the sum of the squares of the terms of the finite Fourier sine and cosine series, thereby eliminating phase information from said heterodyned signals.

4. The apparatus of claim 3 wherein said target is a cloud, and said averaging means is a computer which determines the presence of cloud as a function of altitude, the cumulative scatter cross section, and the velocity distribution of any rainfall present.

5. The apparatus of claim 1 wherein said source is a Gunn diode oscillator which generates radiation at a frequency of approximately 35 GHz.

6. The apparatus of claim 1 wherein said source comprises means for linearizing said frequency sweeps with respect to time.

7. The apparatus of claim 1 wherein said microwave source has a power of approximately 200 milliwatts.

8. The apparatus of claim 1 wherein:
   an analog-to-digital converter is connected between said bouncing means and said Fourier transform means; and
   said Fourier transform means converts a digitized amplitude-versus-time curve into a digitized amplitude-versus-frequency curve corresponding to heterodyned signals obtained over a duration of one frequency sweep.

9. A swept frequency microwave system for analyzing a target comprising:
   a source of microwave radiation whose frequency is made to sweep in a repetitive fashion;
   means connected to said source for bouncing said radiation off the target, said bouncing means producing a series of heterodyned signals;
   means connected to said bouncing means for taking the Fourier transform of a group of said heterodyned signals; and means connected to said Fourier transform means for averaging the Fourier transformed signals over a plurality of frequency sweeps;

wherein said bouncing means comprises a single antenna for directing the microwave radiation transmitted from the source to the target and for receiving the resultant echo signals from said target.

10. The apparatus of claim 9 wherein the antenna is a J-hook reflector antenna.

11. The apparatus of claim 9 wherein said bouncing means further comprises a circulator connected to said source, to said antenna, and to said Fourier transform means for isolating the received echo signals exiting the antenna from the transmitted signals entering the antenna.

12. The apparatus of claim 1 wherein said bouncing means further comprises a mixer connected to said circulator and to said source for heterodyning the received echo signals with the signals transmitted by said source.

13. The apparatus of claim 12 wherein said bouncing means further comprises an attenuator connected between the source and the mixer for attenuating the signals transmitted by the source for convenient heterodyning in the mixer.

14. A swept frequency microwave system for analyzing a target comprising:

a source of microwave radiation whose frequency is made to sweep in a repetitive fashion;

means connected to said source for bouncing said radiation off the target, said bouncing means producing a series of heterodyned signals;

means connected to said bouncing means for taking the Fourier transform of a group of said heterodyned signals; and means connected to said Fourier transform means for averaging the Fourier transformed signals over a plurality of frequency sweeps;

wherein said averaging means comprises a computer which uses built-in empirical information to reformat the Fourier transformed signals into output information providing convenient analysis of the target.

15. The apparatus of claim 14 further comprising at least one environmental input device, each said device producing environmental signals and being connected to said computer, wherein said computer uses said environmental signals to refine its output information.

16. The apparatus of claim 14 further comprising a preamplifier connected between said bouncing means and said Fourier transform means;

wherein said computer comprises means for checking for an overflow condition within said Fourier transform means, said checking means producing an overflow signal when an overflow condition persists;

wherein said overflow signal is communicated to said preamplifier for decreasing the gain of said preamplifier.

17. A method for analyzing a target comprising:

directing a low-power swept-frequency CW signal at the target;

heterodyning the echoes returned by the target with the CW signal to produce heterodyned signals;

taking the Fourier power transform of the heterodyned signals; and averaging the Fourier transformed signals over several frequency sweeps.

18. The method of claim 17 wherein said step of taking the Fourier transform comprises the substep of taking the sum of the squares of the terms of the sine and cosine finite Fourier series so as to remove phase information present in said heterodyned signals.

19. The method of claim 17 wherein said target is the lower atmosphere, and further comprising the step of reformatting the averaged signals to indicate presence of clouds as a function of height above ground.

20. The method of claim 19 wherein said reformatting step comprises the substep of initializing for environmental conditions so as to normalize cloud height and analyzing cloud intensity data for comparison with other locations and environments.

21. The method of claim 19 wherein said reformatting further comprises the substep of computing the vertical fall velocity of rainfall, the cumulative scatter cross-section of the target, and the rainfall rate.

* * * * *

UNITED STATES PATENT AND TRADEMARK OFFICE
CERTIFICATE OF CORRECTION

PATENT NO. : 4,268,828
DATED : May 19, 1981
INVENTOR(S) : Robert W. Cribbs, Billy L. Lamb & Thomas J. DeLacy It is certified that error appears in the above-identified patent and that said Letters Patent are hereby corrected as shown below:

In column 11, claim 12, line 1 delete "1" and insert in place thereof --11--;

Signed and Sealed this

Twenty-fifth Day of August 1981

[SEAL]

Attest:

Attesting Officer

GERALD J. MOSSINGHOFF

Commissioner of Patents and Trademarks